(12) United States Patent
Gao et al.

(10) Patent No.: US 12,501,422 B2
(45) Date of Patent: Dec. 16, 2025

(54) UCI TRANSMISSION METHOD, DEVICE, TERMINAL AND BASE STATION

(71) Applicant: DATANG MOBILE COMMUNICATIONS EQUIPMENT CO., LTD., Beijing (CN)

(72) Inventors: Xuejuan Gao, Beijing (CN); Qianqian Si, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 976 days.

(21) Appl. No.: 17/633,522

(22) PCT Filed: Jul. 13, 2020

(86) PCT No.: PCT/CN2020/101610
§ 371 (c)(1),
(2) Date: Feb. 7, 2022

(87) PCT Pub. No.: WO2021/022976
PCT Pub. Date: Feb. 11, 2021

(65) Prior Publication Data
US 2022/0353884 A1    Nov. 3, 2022

(30) Foreign Application Priority Data
Aug. 8, 2019 (CN) .......................... 201910731769.3

(51) Int. Cl.
*H04L 5/00* (2006.01)
*H04W 72/1268* (2023.01)
*H04W 72/566* (2023.01)

(52) U.S. Cl.
CPC ....... *H04W 72/1268* (2013.01); *H04L 5/0055* (2013.01); *H04W 72/569* (2023.01)

(58) Field of Classification Search
CPC .......... H04W 72/1268; H04W 72/569; H04W 72/0446; H04W 72/21; H04L 5/0055; H04L 5/0053
See application file for complete search history.

(56) References Cited

U.S. PATENT DOCUMENTS 10,104,568 B2    10/2018  Chen et al.
2013/0022019 A1*  1/2013  Han .................... H04L 5/0026
                                                    370/329

(Continued)

FOREIGN PATENT DOCUMENTS

| CN | 106067845 A | 11/2016 |
| WO | 2018127131 A1 | 7/2018 |
| WO | 2019098697 A1 | 5/2019 |

OTHER PUBLICATIONS

3GPP TSG RAN WG1 Huawei, Hisilicon UL intra—UE multiplexing between control channels Meeting #97 R1-1907547 May 13-17, 2019.*

(Continued)

*Primary Examiner* — Joseph E Dean, Jr.
(74) *Attorney, Agent, or Firm* — Ladas & Parry, LLP

(57) ABSTRACT

The present disclosure provides an uplink control information (UCI) transmission method and device, a terminal and a base station, the method includes: when a physical uplink control channel (PUCCH) carrying a first UCI and a PUCCH carrying a second UCI overlap in a time domain, dropping the second UCI and transmitting the first UCI, if a PUCCH format used for simultaneous transmission of the first UCI and the second UCI is different from a PUCCH format used for a PUCCH carrying the first UCI.

14 Claims, 3 Drawing Sheets when a physical uplink control channel (PUCCH) carrying a first UCI and a PUCCH carrying a second UCI overlap in a time domain, determining that the second UCI is dropped and receiving only the first UCI, if a PUCCH format used for simultaneous transmission of the first UCI and the second UCI is different from a PUCCH format used by a PUCCH carrying the first UCI.    S710

(56) References Cited

U.S. PATENT DOCUMENTS

| | | | |
|---|---|---|---|
| 2019/0327726 A1 | 10/2019 | Zhang et al. | |
| 2022/0217739 A1* | 7/2022 | Gao | H04L 1/1812 |
| 2023/0345472 A1* | 10/2023 | Takahashi | H04W 72/21 |

OTHER PUBLICATIONS

International Search Report for PCT Application PCT/CN2020/101610 issued on Sep. 28, 2020 and its English Translation provided by WIPO.

Written Opinion for PCT Application PCT/CN2020/101610 issued on Sep. 28, 2020, and its English Translation provided by WIPO.

Internationally Preliminary Report on Patentability for PCT/CN2020/101610 issued on Feb. 8, 2022, and English translation provided by WIPO.

"Intra-UE UCI multiplexing," 3GPP TSG RAN WG1 Meeting #95, R1-1813664, Spokane, USA, Nov. 12-16, 2018, Agenda Item: 7.2.6.4, Source: Huawei, HiSilicon, all pages.

"UCI enhancements for URLLC," 3GPP TSG RAN WG1 Meeting #97, R1-1906058, Reno, USA, May 13-17, 2019, Agenda Item: 7.2.6.2, Source: Huawei, HiSilicon, all pages.

"UL intra-UE multiplexing between control channels," 3GPP TSG RAN WG1 Meeting #97, R1-1907547, Reno, USA, May 13-17, 2019, Agenda Item: 7.2.6.7, Source: Huawei, HiSilicon, all pages.

Extended European Search Report for European Patent Application 20850538.8, issued by the European Patent Application on Sep. 13, 2022.

"Email discussion [69-10]: Details of collision handling and compression/multiplexing in case of 2 or more CSIs being configured in the same reporting instance for CoMP CSI feedback," 3GPP TSG RAN WG1 Meeting #69, R1-122930, Prague, Czech Republic, May 21-25, 2012, Source: Fujitsu, Agenda Item: 7.5.1.4, all pages.

"On multiplexing of different UCI transmissions," 3GPP TSG RAN WG1 Meeting #92bis, R1-1803754, Sanya, China, Apr. 16-20, 2018, Source: CATT, all pages.

* cited by examiner

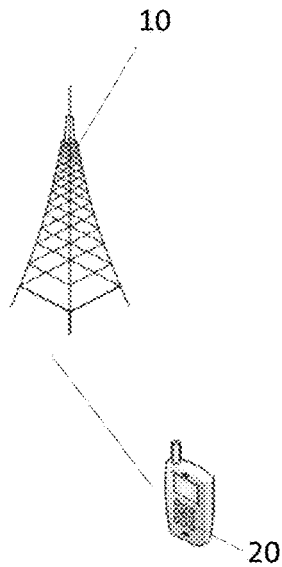
Fig.1
when a physical uplink control channel (PUCCH) carrying a first UCI and a PUCCH carrying a second UCI overlap in a time domain, dropping the second UCI and transmitting the first UCI, if a PUCCH format used for simultaneous transmission of the first UCI and the second UCI is different from a PUCCH format used by a PUCCH carrying the first UCI. ⟵ S210
Fig.2
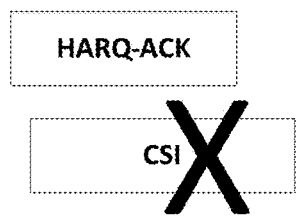
Fig.3

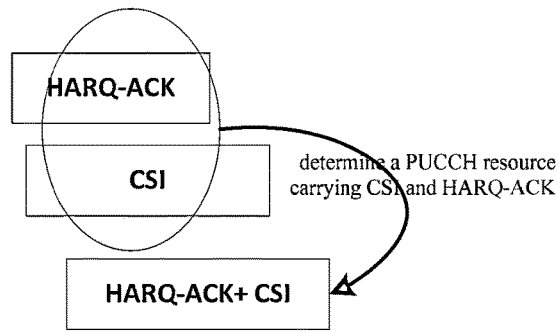
Fig.4
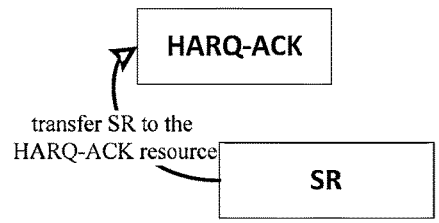
Fig.5
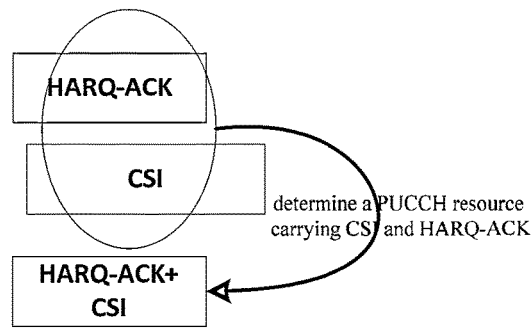
Fig.6
when a physical uplink control channel (PUCCH) carrying a first UCI and a PUCCH carrying a second UCI overlap in a time domain, determining that the second UCI is dropped and receiving only the first UCI, if a PUCCH format used for simultaneous transmission of the first UCI and the second UCI is different from a PUCCH format used by a PUCCH carrying the first UCI. — S710
Fig.7

UCI TRANSMISSION METHOD, DEVICE, TERMINAL AND BASE STATION

CROSS-REFERENCE TO RELATED APPLICATIONS

This application is the U.S. national phase of PCT Application No. PCT/CN2020/101610 filed on Jul. 13, 2020, which claims priority to Chinese Patent Application No. 201910731769.3 filed on Aug. 8, 2019, the disclosures of which are incorporated in their entireties by reference herein.

TECHNICAL FIELD

The present disclosure relates to the field of wireless technology, in particular to a UCI transmission method and device and a terminal and a base station.

BACKGROUND

Currently, in Rel-16 of 5G NR, there will be uplink control information (UCI) transmission corresponding to different service types, such as UCI corresponding to high priority services (Ultra Reliable Low Latency Communication, URLLC) and UCI corresponding to low priority services (such as Enhanced Mobile Broadband, eMBB), so there may be overlap between UCI transmissions corresponding to different service types.

For example, the Hybrid Automatic Repeat reQuest (HARQ)-return acknowledgement (ACK) corresponding to URLLC may overlap with the Channel State Information (CSI), and the HARQ-ACK corresponding to URLLC may overlap with the Scheduling Request (SR) and/or HARQ-ACK corresponding to eMBB.

When the above UCI transmissions corresponding to different service types overlap, the transmission delay and reliability of the UCI corresponding to URLLC services may be affected if the conventional multiplexing transmission rules are simply reused and the multiplexing transmission of UCI corresponding to different services is performed.

SUMMARY

The purpose of the present disclosure is to provide a UCI transmission method and device and a terminal and a base station, which are used to ensure the transmission delay and reliability of UCI in URLLC services.

An embodiment of the present disclosure provides a transmission method of uplink control information (UCI), which is applied to a terminal, wherein the method includes:
when a physical uplink control channel (PUCCH) carrying a first UCI and a PUCCH carrying a second UCI overlap in a time domain, dropping the second UCI and transmitting the first UCI, if a PUCCH format used for simultaneous transmission of the first UCI and the second UCI is different from a PUCCH format used for the PUCCH carrying the first UCI.

Optionally, the transmission method, wherein a priority of a service type to which the first UCI belongs is higher than a priority of a service type to which the second UCI belongs; or,
the first UCI belongs to an Ultra Reliable Low Latency Communication (URLLC) service, and the second UCI belongs to an Enhanced Mobile Broadband (eMBB) service; or,
a priority of the first UCI is higher than a priority of the second UCI.

Optionally, the transmission, wherein, the dropping the second UCI if the PUCCH format used for simultaneous transmission of the first UCI and the second UCI is different from the PUCCH format used for the PUCCH carrying the first UCI includes at least one of:
dropping the second UCI if a PUCCH format used for transmission of the first UCI is a first PUCCH format, and a number of bits of the second UCI is greater than a preset value;
dropping the second UCI if a number of bits of the first UCI is less than or equal to a preset value, and the number of bits of the second UCI is greater than a preset value;
dropping the second UCI if the PUCCH format used for transmission of the first UCI is a first PUCCH format and a PUCCH format used for transmission of the second UCI is a second PUCCH format;
dropping the second UCI if a number of bits of the first UCI is less than or equal to a preset value, and a PUCCH format used for transmission of the second UCI is a second PUCCH format;
dropping the second UCI if the PUCCH format used for transmission of the first UCI is a first PUCCH format, and the second UCI is channel state information (CSI);
dropping the second UCI if a number of bits of the first UCI is less than or equal to a preset value, and the second UCI is channel state information (CSI);
dropping the second UCI if the first UCI is a hybrid automatic repeat request acknowledgement (HARQ-ACK) corresponding to a preset service type and/or a scheduling request (SR) corresponding to a preset service type, and the PUCCH format used for transmission of the first UCI is a first PUCCH format, and the second UCI is CSI;
dropping the second UCI if the first UCI is a hybrid automatic repeat request acknowledgement HARQ-ACK corresponding to a preset service type and/or scheduling request SR corresponding to a preset service type, and the number of bits of the first UCI is less than or equal to the preset value, the first UCI is CSI;
dropping the second UCI if the PUCCH format used for transmission of the first UCI is a first PUCCH format, and a total number of bits of the first UCI and the second UCI is greater than a preset value;
dropping the second UCI if a number of bits of the first UCI is less than or equal to a preset value, and a total number of bits of the first UCI and the second UCI is greater than a preset value;
wherein, the first PUCCH format includes at least one of PUCCH format 0 and PUCCH format 1;
the second PUCCH format includes at least one of PUCCH format 2, PUCCH format 3 and PUCCH format 4;
the preset service type is URLLC or a high-priority service type.

Optionally, the transmission method, wherein the preset value is 2.

An embodiment of the present disclosure provides a transmission method of uplink control information (UCI), which is applied to a base station, wherein the method includes:
when a physical uplink control channel (PUCCH) carrying a first UCI and a PUCCH carrying a second UCI overlap in a time domain, determining that the second UCI is dropped and receiving only the first UCI, if a PUCCH format used for simultaneous transmission of the first UCI and the second UCI is different from a PUCCH format used for the PUCCH carrying the first UCI.

Optionally, the transmission method, wherein a priority of a service type to which the first UCI belongs is higher than a priority of a service type to which the second UCI belongs; or, the first UCI belongs to an Ultra Reliable Low Latency Communication (URLLC) service, and the second UCI belongs to an Enhanced Mobile Broadband (eMBB) service; or, a priority of the first UCI is higher than a priority of the second UCI.

Optionally the transmission method, wherein, the determining that the second UCI is dropped if the PUCCH format used for simultaneous transmission of the first UCI and the second UCI is different from the PUCCH format used for the PUCCH carrying the first UCI includes at least one of:

determining that the second UCI is dropped if a PUCCH format used for transmission of the first UCI is a first PUCCH format, and a number of bits of the second UCI is greater than a preset value;

determining that the second UCI is dropped if a number of bits of the first UCI is less than or equal to a preset value, and the number of bits of the second UCI is greater than a preset value;

determining that the second UCI is dropped if the PUCCH format used for transmission of the first UCI is a first PUCCH format and a PUCCH format used for transmission of the second UCI is a second PUCCH format;

determining that the second UCI is dropped if a number of bits of the first UCI is less than or equal to a preset value, and a PUCCH format used for transmission of the second UCI is a second PUCCH format;

determining that the second UCI is dropped if the PUCCH format used for transmission of the first UCI is a first PUCCH format, and the second UCI is channel state information (CSI);

determining that the second UCI is dropped if a number of bits of the first UCI is less than or equal to a preset value, and the second UCI is channel state information (CSI);

determining that the second UCI is dropped if the first UCI is a hybrid automatic repeat request acknowledgement (HARQ-ACK) corresponding to a preset service type and/or a scheduling request (SR) corresponding to a preset service type, and the PUCCH format used for transmission of the first UCI is a first PUCCH format, and the second UCI is CSI;

determining that the second UCI is dropped if the first UCI is a hybrid automatic repeat request acknowledgement HARQ-ACK corresponding to a preset service type and/or scheduling request SR corresponding to a preset service type, and the number of bits of the first UCI is less than or equal to the preset value, the first UCI is CSI;

determining that the second UCI is dropped if the PUCCH format used for transmission of the first UCI is a first PUCCH format, and a total number of bits of the first UCI and the second UCI is greater than a preset value;

determining that the second UCI is dropped if a number of bits of the first UCI is less than or equal to a preset value, and a total number of bits of the first UCI and the second UCI is greater than a preset value;

wherein, the first PUCCH format includes at least one of PUCCH format 0 and PUCCH format 1;

the second PUCCH format includes at least one of PUCCH format 2, PUCCH format 3 and PUCCH format 4;

the preset service type is URLLC or a high-priority service type.

Optionally, the transmission method, wherein the preset value is 2.

An embodiment of the present disclosure provides a terminal, including: a transceiver, a memory, a processor and a program stored in the memory and running on the processor; wherein the processor is used for:

when a physical uplink control channel (PUCCH) carrying a first UCI and a PUCCH carrying a second UCI overlap in a time domain, dropping the second UCI and transmitting the first UCI, if a PUCCH format used for simultaneous transmission of the first UCI and the second UCI is different from a PUCCH format used for the PUCCH carrying the first UCI.

Optionally, the terminal, wherein a priority of a service type to which the first UCI belongs is higher than a priority of a service type to which the second UCI belongs; or, the first UCI belongs to an Ultra Reliable Low Latency Communication (URLLC) service, and the second UCI belongs to an Enhanced Mobile Broadband (eMBB) service; or, a priority of the first UCI is higher than a priority of the second UCI.

Optionally, the terminal, wherein, the dropping the second UCI if the PUCCH format used for simultaneous transmission of the first UCI and the second UCI is different from the PUCCH format used for the PUCCH carrying the first UCI includes at least one of:

dropping the second UCI if a PUCCH format used for transmission of the first UCI is a first PUCCH format, and a number of bits of the second UCI is greater than a preset value;

dropping the second UCI if a number of bits of the first UCI is less than or equal to a preset value, and the number of bits of the second UCI is greater than a preset value;

dropping the second UCI if the PUCCH format used for transmission of the first UCI is a first PUCCH format and a PUCCH format used for transmission of the second UCI is a second PUCCH format;

dropping the second UCI if a number of bits of the first UCI is less than or equal to a preset value, and a PUCCH format used for transmission of the second UCI is a second PUCCH format;

dropping the second UCI if the PUCCH format used for transmission of the first UCI is a first PUCCH format, and the second UCI is channel state information (CSI);

dropping the second UCI if a number of bits of the first UCI is less than or equal to a preset value, and the second UCI is channel state information (CSI);

dropping the second UCI if the first UCI is a hybrid automatic repeat request acknowledgement (HARQ-ACK) corresponding to a preset service type and/or a scheduling request (SR) corresponding to a preset service type, and the PUCCH format used for transmission of the first UCI is a first PUCCH format, and the second UCI is CSI;

dropping the second UCI if the first UCI is a hybrid automatic repeat request acknowledgement HARQ-ACK corresponding to a preset service type and/or scheduling request SR corresponding to a preset service type, and the number of bits of the first UCI is less than or equal to the preset value, the first UCI is CSI;

dropping the second UCI if the PUCCH format used for transmission of the first UCI is a first PUCCH format, and a total number of bits of the first UCI and the second UCI is greater than a preset value;

dropping the second UCI if a number of bits of the first UCI is less than or equal to a preset value, and a total number of bits of the first UCI and the second UCI is greater than a preset value;

wherein, the first PUCCH format includes at least one of PUCCH format 0 and PUCCH format 1;

the second PUCCH format includes at least one of PUCCH format 2, PUCCH format 3 and PUCCH format 4;

the preset service type is URLLC or a high-priority service type.

Optionally, the transmission method, wherein the preset value is 2.

An embodiment of the present disclosure also provides a base station, including: a transceiver, a memory, a processor, and a program stored in the memory and running on the processor; wherein the processor is used for:

when a physical uplink control channel (PUCCH) carrying a first UCI and a PUCCH carrying a second UCI overlap in a time domain, determining that the second UCI is dropped and receiving only the first UCI, if a PUCCH format used for simultaneous transmission of the first UCI and the second UCI is different from a PUCCH format used for the PUCCH carrying the first UCI.

Optionally, the base station, wherein a priority of a service type to which the first UCI belongs is higher than a priority of a service type to which the second UCI belongs; or, the first UCI belongs to an Ultra Reliable Low Latency Communication (URLLC) service, and the second UCI belongs to an Enhanced Mobile Broadband (eMBB) service; or, a priority of the first UCI is higher than a priority of the second UCI.

Optionally, the base station, wherein, the determining that the second UCI is dropped if the PUCCH format used for simultaneous transmission of the first UCI and the second UCI is different from the PUCCH format used for the PUCCH carrying the first UCI comprises at least one of:

determining that the second UCI is dropped if a PUCCH format used for transmission of the first UCI is a first PUCCH format, and a number of bits of the second UCI is greater than a preset value;

determining that the second UCI is dropped if a number of bits of the first UCI is less than or equal to a preset value, and the number of bits of the second UCI is greater than a preset value;

determining that the second UCI is dropped if the PUCCH format used for transmission of the first UCI is a first PUCCH format and a PUCCH format used for transmission of the second UCI is a second PUCCH format;

determining that the second UCI is dropped if a number of bits of the first UCI is less than or equal to a preset value, and a PUCCH format used for transmission of the second UCI is a second PUCCH format;

determining that the second UCI is dropped if the PUCCH format used for transmission of the first UCI is a first PUCCH format, and the second UCI is channel state information (CSI);

determining that the second UCI is dropped if a number of bits of the first UCI is less than or equal to a preset value, and the second UCI is channel state information (CSI);

determining that the second UCI is dropped if the first UCI is a hybrid automatic repeat request acknowledgement (HARQ-ACK) corresponding to a preset service type and/or a scheduling request (SR) corresponding to a preset service type, and the PUCCH format used for transmission of the first UCI is a first PUCCH format, and the second UCI is CSI;

determining that the second UCI is dropped if the first UCI is a hybrid automatic repeat request acknowledgement HARQ-ACK corresponding to a preset service type and/or scheduling request SR corresponding to a preset service type, and the number of bits of the first UCI is less than or equal to the preset value, the first UCI is CSI;

determining that the second UCI is dropped if the PUCCH format used for transmission of the first UCI is a first PUCCH format, and a total number of bits of the first UCI and the second UCI is greater than a preset value;

determining that the second UCI is dropped if a number of bits of the first UCI is less than or equal to a preset value, and a total number of bits of the first UCI and the second UCI is greater than a preset value;

wherein, the first PUCCH format includes at least one of PUCCH format 0 and PUCCH format 1;

the second PUCCH format includes at least one of PUCCH format 2, PUCCH format 3 and PUCCH format 4;

the preset service type is URLLC or a high-priority service type.

Optionally, the transmission method, wherein the preset value is 2.

An embodiment of the present disclosure also provides a transmission device of uplink control information (UCI), applied to a terminal, including:

a transmission module, configured to, when a physical uplink control channel (PUCCH) carrying a first UCI and a PUCCH carrying a second UCI overlap in a time domain, drop the second UCI and transmitting the first UCI, if a PUCCH format used for simultaneous transmission of the first UCI and the second UCI is different from a PUCCH format used for the PUCCH carrying the first UCI.

An embodiment of the present disclosure also provides transmission device of uplink control information (UCI), applied to a base station, including:

a receiving module, configured to, when a physical uplink control channel (PUCCH) carrying a first UCI and a PUCCH carrying a second UCI overlap in a time domain, determine that the second UCI is dropped and receiving only the first UCI, if a PUCCH format used for simultaneous transmission of the first UCI and the second UCI is different from a PUCCH format used for the PUCCH carrying the first UCI.

An embodiment of the present disclosure also provides a computer readable storage medium with a computer program stored thereon, when executed by a processor, the program implements the steps in the transmission method of uplink control information (UCI) as described in any one of the above.

At least one of the above-mentioned technical solutions in the specific embodiments of the present disclosure has the following beneficial effects:

In the method of transmitting the uplink control information UCI described in the embodiments of the present disclosure, when the PUCCH carrying the first UCI and the PUCCH carrying the second UCI overlap in the time domain, if the simultaneous transmission of both the first UCI and the second UCI causes the first UCI to change the PUCCH format used, for example from PUCCH format 0 or 1, to PUCCH format 2, the second UCI will be dropped, and only the first UCI is transmitted. This method can be applied to the UCI transmission of URLLC services to avoid transmission delay and reliability problem of the UCI of the corresponding URLLC services when the UCI transmission of different service types overlaps.

BRIEF DESCRIPTION OF THE DRAWING

FIG. 1 is a schematic architectural diagram of a wireless communication system to which a transmission method of uplink control information (UCI) applied according to the present disclosure;

FIG. 2 is a schematic flowchart of a transmission method according to an embodiment of the present disclosure;

FIG. 3 is a first schematic diagram of the relationship between a first UCI and a second UCI using a transmission method according to an embodiment of the present disclosure;

FIG. 4 is a second schematic diagram of the relationship between a first UCI and a second UCI using a transmission method according to an embodiment of the present disclosure;

FIG. 5 is a third schematic diagram of the relationship between a first UCI and a second UCI using a transmission method according to an embodiment of the present disclosure;

FIG. 6 is a fourth schematic diagram of the relationship between a first UCI and a second UCI using a transmission method according to an embodiment of the present disclosure;

FIG. 7 is a schematic flowchart of a transmission method according to another embodiment of the present disclosure;

DETAILED DESCRIPTION

Figure 8:
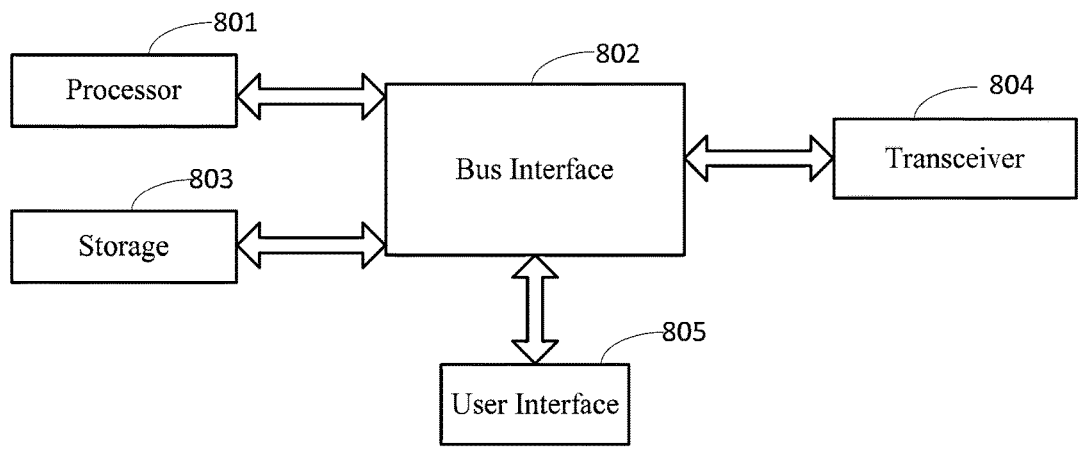
FIG. 8 is a schematic structural diagram of a terminal according to an embodiment of the disclosure.

In order to make the technical problems to be solved by the present disclosure, technical solutions and advantages clearer, a detailed description will be given below in conjunction with the accompanying drawings and specific embodiments.

The transmission method of uplink control information (UCI) according to an embodiment of the present disclosure is applied to a wireless communication system, and the wireless communication system may be a 5G system, or an Evolved Long Term Evolution (eLTE) system, or a subsequent evolved communication system.

FIG. 1 is a schematic structural diagram of a wireless communication system provided in an embodiment of the present disclosure. As shown in FIG. 1, the wireless communication system may include: a base station and a user equipment (or terminal). Among them, for example, the terminal is denoted as UE 20, and the UE 20 can be connected to the base station 10. In actual applications, the connection between the above-mentioned various devices may be a wireless connection. In order to conveniently and intuitively indicate the connection relationship between the various devices, a solid line is used in FIG. 1 to indicate.

The base station 10 provided in an embodiment of the present disclosure may be a commonly used base station, may also be an evolved node base station (eNB), or may be a network side device in a 5G system (for example, a next generation node base station, gNB) or a transmission and reception point (TRP) or a cell and another equipment.

The user equipment provided in an embodiments of the present disclosure may be a mobile phone, a tablet computer, a notebook computer, an ultra-mobile personal computer (UMPC), a netbook, or a personal digital assistant (PDA), etc.

An embodiment of the present disclosure provides a transmission method of uplink control information (UCI), which can avoid the problem of the UCI transmission delay and reliability of the corresponding URLLC service when the UCI transmission of different service types overlaps.

As shown in FIG. 2, the transmission method of uplink control information (UCI) according to one of the embodiments of the present disclosure, applied to a terminal, includes:

S210, when a physical uplink control channel (PUCCH) carrying the first UCI and a PUCCH carrying the second UCI overlap in the time domain, dropping the second UCI and transmitting the first UCI, if the PUCCH format used for simultaneous transmission of the first UCI and the second UCI is different from the PUCCH format used for the PUCCH carrying the first UCI.

Using the UCI transmission method of the an embodiment of the present disclosure, when a physical uplink control channel (PUCCH) carrying the first UCI and a PUCCH carrying the second UCI overlap in the time domain, if multiplexing transmission of the first UCI and the second UCI may cause the first UCI to change the PUCCH format used, for example, from PUCCH format 0 or 1 to PUCCH format 2, PUCCH format 3 or PUCCH format 4, then the multiplexing transmission of the first UCI and the second UCI is not performed, the second UCI is dropped, and only the first UCI is transmitted.

The UCI transmission method of an embodiment of the present disclosure may be applied to the UCI transmission of the URLLC service. For the overlap of UCI transmission of different service types or different priorities, the rules of multiplexing transmission will not be simply adopted, but the UCI transmission will be ensured without affecting the transmission reliability and delay of high priority UCI.

Specifically, in the embodiment of the present disclosure, the priority of the service type to which the first UCI belongs is higher than the priority of the service type to which the second UCI belongs; or, the first UCI belongs to an Ultra Reliable Low Latency Communication (URLLC) service, and the second UCI belongs to an Enhanced Mobile Broadband (eMBB) service; or, the priority of the first UCI is higher than the priority of the second UCI.

Based on the above method, when UCI transmissions of different service types or different priorities overlap, if multiplexing the transmission of the first UCI and the second UCI will cause the first UCI with a higher priority to change the PUCCH format used, then the multiplexing transmission of the first UCI and the second UCI is not performed, the second UCI with lower priority is dropped, and only the first UCI with higher priority is transmitted. This method is applied to UCI transmission of URLLC service, and it can ensure the transmission delay and reliability of UCI in URLLC service and avoid affecting the transmission reliability and delay of high-priority UCI.

In an embodiment of the present embodiment, optionally, in step S210, the dropping the second UCI if the PUCCH format used for simultaneous transmission of the first UCI and the second UCI is different from the PUCCH format used for the PUCCH carrying the first UCI specifically includes at least one of:

dropping the second UCI if the PUCCH format used for transmission of the first UCI is the first PUCCH format, and the number of bits of the second UCI is greater than a preset value;

dropping the second UCI if the number of bits of the first UCI is less than or equal to a preset value, and the number of bits of the second UCI is greater than a preset value;

dropping the second UCI if the PUCCH format used for transmission of the first UCI is the first PUCCH format and the PUCCH format used for transmission of the second UCI is the second PUCCH format;

dropping the second UCI if the number of bits of the first UCI is less than or equal to a preset value, and the PUCCH format used for transmission of the second UCI is the second PUCCH format;

dropping the second UCI if the PUCCH format used for transmission of the first UCI is the first PUCCH format, and the second UCI is channel state information (CSI);

dropping the second UCI if the number of bits of the first UCI is less than or equal to a preset value, and the second UCI is channel state information (CSI);

dropping the second UCI if the first UCI is a hybrid automatic repeat request acknowledgement (HARQ-ACK) and/or a scheduling request (SR) corresponding to a preset service type, and the PUCCH format used for transmission of the first UCI is the first PUCCH format, and the second UCI is CSI;

dropping the second UCI if the first UCI is a hybrid automatic repeat request acknowledgement HARQ-ACK and/or scheduling request SR corresponding to a preset service type, and the number of bits of the first UCI is less than or equal to the preset value, the first UCI is CSI;

dropping the second UCI if the PUCCH format used for transmission of the first UCI is the first PUCCH format, and the total number of bits of the first UCI and the second UCI is greater than a preset value;

dropping the second UCI if the number of bits of the first UCI is less than or equal to a preset value, and the total number of bits of the first UCI and the second UCI is greater than a preset value;

wherein, the first PUCCH format includes at least one of PUCCH format 0 and PUCCH format 1;

the second PUCCH format includes at least one of PUCCH format 2, PUCCH format 3 and PUCCH format 4;

the preset service type is URLLC or a high-priority service type.

Optionally, the preset value is 2.

When the first UCI and the second UCI meet at least one of the foregoing conditions, it may be determined that the PUCCH format for transmitting the first UCI and the second UCI at the same time is different from the PUCCH format for transmitting the first UCI.

It should be pointed out that, simultaneous transmission (may also be referred to as multiplexing transmission) of the first UCI and second UCI may include, but is not limited to the following forms, wherein the first UCI is at least one of the HARQ-ACK and SR (may be only HARQ-ACK, or only SR, or both HARQ-ACK and SR); the second UCI is at least one of HARQ-ACK, CSI, SR (for example, CSI, or SR, or CSI and SR, or HARQ-ACK, or HARQ-ACK and SR, or HARQ-ACK, R and CSI); specifically, when the PUCCHs carrying different UCIs overlap in the time domain, the multiplexing transmission of UCI may be performed according to the following multiplexing transmission rules:

1) when the PUCCH carrying SR and the PUCCH carrying HARQ-ACK of overlap in the time domain, and the PUCCH carrying HARQ-ACK using the PUCCH format 0 (the PUCCH carrying SR may use format 0 or format 1), performing multiplexing transmission SR and HARQ-ACK on the PUCCH resource of the HARQ-ACK, that is, transmitting HARQ-ACK by choosing to use the Cyclic Shift (CS) corresponding to the presence of positive or negative SR on the PUCCH resource of HARQ-ACK, implicitly indicating whether the SR is positive or negative;

2) when the PUCCH carrying SR and the PUCCH carrying HARQ-ACK overlap in the time domain, the PUCCH carrying SR using the PUCCH format 0, and the PUCCH carrying HARQ-ACK using the PUCCH format 1, dropping SR, that is, not performing multiplexing transmission at this time;

3) when the PUCCH carrying SR and the PUCCH carrying HARQ-ACK overlap in the time domain, the PUCCH carrying SR using the PUCCH format 0, and the PUCCH carrying HARQ-ACK using the PUCCH format 1, if there is positive SR, transmitting HARQ-ACK in the PUCCH resource of the SR, so that implicitly expressing the simultaneous presence of SR transmissions by transmitting HARQ-ACK in PUCCH resource corresponding to the SR; if SR is negative, transmitting HARQ-ACK in PUCCH resource of the HARQ-ACK;

4) when the PUCCH carrying SR and the PUCCH carrying HARQ-ACK overlap in the time domain, and the PUCCH carrying HARQ-ACK using the PUCCH format 2 or 3 or 4 (the PUCCH carrying SR may use format 0 or format 1), determining a PUCCH resource set according to the total number of bits of the SR and HARQ-ACK, According to the PUCCH resource indication domain in the Downlink Control Information (DCI) corresponding to HARQ-ACK, determining a PUCCH resource in the determined PUCCH resource set for simultaneous transmission of SR and HARQ-ACK, where SR is X bits, indicating the SR state of X SRs overlapping with HARQ-ACK (which is positive or both are negative) in X SRs, that is, regardless of whether the SR is positive or negative, always transmitting X bits of SR to avoid changes in the number of UCI bits transmitted on the PUCCH resource of the HARQ-ACK due to the SR state.

5) when the PUCCH carrying the Semi-Persistent Scheduling (SPS) HARQ-ACK (i.e., the HARQ-ACK corresponding to the SPS PDSCH) and/or SR overlaps in the time domain with the PUCCH carrying the CSI, transferring the SPS HARQ-ACK and/or SR to the PUCCH resource corresponding to the CSI for multiplexing transmissions with the CSI.

6) When the PUCCH carrying the HARQ-ACK corresponding to Physical Downlink Control Channel (PDCCH) and the PUCCH carrying the CSI overlap in the time domain, selecting a PUCCH resource set from the multiple PUCCH resource sets according to the total number of bits of the HARQ-ACK and the CSI, and determining a PUCCH resource from the selected PUCCH resource set according to the PUCCH resource indication domain in the DCI corresponding to HARQ-ACK for simultaneously carrying HARQ-ACK and CSI; at this time, the redetermined PUCCH resource may be the same or different from the original PUCCH resource carrying HARQ-ACK (if different, then that is a new PUCCH resource). Wherein, the HARQ-ACK corresponding to PDCCH specifically is: when HARQ-ACK is the feedback information of Physical Downlink Shared Channel (PDSCH) with PDCCH scheduling, the PDCCH corresponds to HARQ-ACK, when HARQ-ACK is the feedback information of the PDCCH (also called SPS PDSCH release) indicating the release of the downlink SPS, the PDCCH corresponds to HARQ-ACK.

7) When the PUCCH carrying the HARQ-ACK and SR of the corresponding PDCCH overlaps with the PUCCH carrying the CSI in the time domain, or, when the PUCCH carrying the HARQ-ACK of the corresponding PDCCH overlaps with the PUCCH carrying the CSI and SR in the time domain, or, when the PUCCH carrying the HARQ-ACK and SR of the corresponding PDCCH overlap with the PUCCH carrying CSI and SR in the time domain, selectin a PUCCH resource set from multiple PUCCH resource sets according to the total number of bits of HARQ-ACK, CSI, and SR, and then determining a PUCCH resource set from the selected PUCCH resource set according to the PUCCH resource indication domain in the DCI corresponding to the HARQ-ACK for simultaneously carrying HARQ-ACK, CSI and SR; at this time, the redetermined PUCCH resource may be the same or different from the original PUCCH resource carrying HARQ-ACK (if different, it is a new PUCCH resource).

In addition, when there are multiple PUCCHs in a time slot, and there is overlap between PUCCHs, suppose that the PUCCHs in a time slot constitute a set Q, determine the uplink channel with the earliest start time in the set Q as channel A, and determine Channel A has an overlapping channel set X; for channel A and UCI on channel X, a channel resource for multiplexing transmission is obtained according to the above multiplexing transmission rule, and this multiplexing transmission channel resource is used to replace channel A and channel X in set Q, continue the above steps to determine channel A and channel X in the new Q set, and so on, until multiple PUCCHs that do not overlap in the time domain are obtained.

Before the above multiplexing transmission, if there is a PUCCH carrying HARQ-ACK in the overlapping PUCCHs, it can also be judged whether the following time conditions (timeline) are met between the overlapping PUCCHs, and the multiplexing transmission is performed when the time conditions are met, The time condition is for the terminal to decide how to multiplex before the start of the earliest transmission, and complete the transmission preparation on the earliest channel according to the multiplexing decision. At present, in one situation, the terminal does not expect a scheduling situation that does not meet the time condition. If there is a situation that does not meet the time condition, it is considered to be an incorrect scheduling, that is, the scheduling of the base station needs to ensure that the time condition is always met; another situation is that the terminal determines whether multiplexing transmission is possible according to the judgment result of the time condition. If the time condition is met, the multiplexing transmission can be performed, and if the time condition is not met, the low-priority UCI is directly dropped. Of course, the judgment of the time condition may not be necessary, that is, it is not ruled out that the judgment of the time condition is not performed, and it is directly considered that the multiplexing transmission can always be performed.

Timeline1: the time interval between the start symbol of the earliest channel in the overlapping channel and the end symbol of any one of the PDSCHs corresponding to the HARQ-ACK (that is, the PDSCH that performs HARQ-ACK feedback in the PUCCH that carries the HARQ-ACK) is not shorter than T1 time; i.e., the earliest channel in the overlapping channel has a start symbol no earlier than the T1 time after the end symbol of any of the PDSCHs corresponding to the HARQ-ACK; where T1 is a value predetermined according to the configured and agreed parameters.

Timeline2: If the HARQ-ACK has a corresponding PDCCH, the time interval between the start symbol of the earliest channel in the overlapping channel and the end symbol of any of the PDCCHs corresponding to the HARQ-ACK is not shorter than T2 time; that is, the start symbol of the earliest channel in the overlapping channel is not earlier than T2 time after the end symbol of any of the PDCCHs corresponding to the HARQ-ACK; where T2 is a value predetermined according to the configuration and the agreed parameters.

Based on the multiplexing transmission rules described above, it can be determined whether the PUCCH format for multiplexing transmission of the first UCI and the second UCI is the same as the PUCCH format for transmission of the first UCI when the first UCI and the second UCI satisfy at least one of the aforementioned situations requiring dropping the second UCI.

The specific embodiment of the UCI transmission method provided in the present disclosure is illustrated as follows.

Embodiment 1

Setting a PUCCH carrying the HARQ-ACK corresponding to the URLLC and a PUCCH carrying the CSI overlap in resources, that is, the first UCI is the HARQ-ACK corresponding to the URLLC, and the second UCI is the CSI (it is possible to not distinguish which service is corresponding to, always considering the priority to be low). In addition, setting the first UCI (for HARQ-ACK corresponding to URLLC) to be transmitted using PUCCH format 0 or 1, that is, transmitted using the first PUCCH format; setting the second UCI (for CSI) to have more than 2 bits (that is, the above-mentioned preset value in this implementation is 2), and the second UCI to be transmitted using one of PUCCH formats 2, 3 and 4, that is, transmitted using the second PUCCH format; then:

for the terminal side: since the HARQ-ACK corresponding to the URLLC is transmitted using the first PUCCH format (that is, the number of bits of the HARQ-ACK does not exceed 2 bits) and the number of bits of CSI is greater than 2 bits, or, the CSI is transmitted using the second PUCCH format, or the second UCI is a CSI, or the total number of bits of the HARQ-ACK and the CSI is greater than 2 bits, it is determined that the CSI is dropped, that is, the second UCI is dropped, as shown in FIG. 3;

that is, in embodiment 1, the first UCI and the second UCI satisfy any one of the following situations that require dropping the second UCI:

the PUCCH format used for transmission of the first UCI is the first PUCCH format, and the number of bits of the second UCI is greater than the preset value;

the number of bits of the first UCI is less than or equal to the preset value, and the number of bits of the second UCI is greater than the preset value;

the PUCCH format used for transmission of the first UCI is the first PUCCH format and the PUCCH format used for transmission of the second UCI is the second PUCCH format;

the number of bits of the first UCI is less than or equal to the preset value, and the PUCCH format used for transmission of the second UCI is the second PUCCH format;

the PUCCH format used for transmission of the first UCI is the first PUCCH format, and the second UCI is channel state information (CSI);

the number of bits of the first UCI is less than or equal to the preset value, and the second UCI is channel state information (CSI);

the PUCCH format used for transmission of the first UCI is the first PUCCH format, and the total number of bits of the first UCI and the second UCI is greater than the preset value;

the number of bits of the first UCI is less than or equal to the preset value, and the total number of bits of the first UCI and the second UCI is greater than the preset value;

Therefore, according to the above, when the first UCI and the second UCI meet any of the above conditions, it is determined that if the first UCI and the second UCI are to be transmitted at the same time, when the PUCCH format used for the simultaneous transmission of the first UCI and the second UCI is different from the PUCCH format used for transmitting the first UCI, the second UCI (CSI) is dropped, and the first UCI (the HARQ-ACK corresponding to URLLC) is transmitted to avoid changing the PUCCH format used for transmission of the first UCI.

This is because: since the number of bits of CSI is greater than 2 bits, when the multiplexing transmission of the first UCI and the second UCI is performed according to the conventional multiplexing rules, a PUCCH resource will be selected according to the total number of bits of HARQ-ACK and CSI. Since the total number of bits of HARQ-ACK and CSI is greater than 2 bits, then a PUCCH resource set carrying more than 2 bits of UCI must be selected, and the PUCCH resources contained in this PUCCH resource set correspond to PUCCH format 2, 3 or 4, then if multiplexing transmission is performed, the PUCCH format used for HARQ-ACK transmission needs to be changed from PUCCH format 0, 1 to PUCCH format 2, 3 or 4, as shown in FIG. 3.

Since the transmission performance of PUCCH formats 0 and 1 is better than that of PUCCH formats 2, 3 and 4, format replacement will cause the transmission performance of the HARQ-ACK corresponding to URLLC to decrease. In addition, replacing the PUCCH format also inevitably requires replacing the PUCCH resources, and the new resources used to multiplex the transmission of HARQ-ACK and CSI may be later than the original PUCCH resources carrying the URLLC HARQ-ACK, which will result in increasing the feedback delay of the URLLC HARQ-ACK, as shown in FIG. 4.

Therefore, when it is determined not to perform multiplexing transmission and drop the CSI, and there is no problem of overlapping between CSI and HARQ-ACK, the original PUCCH resource corresponding to HARQ-ACK can be used for transmission in the original format, that is, PUCCH format 0, 1 is used to transmit HARQ-ACK to ensure the transmission reliability of URLLC HARQ-ACK.

For the base station side: when a PUCCH carrying a HARQ-ACK corresponding to a URLLC (the first UCI) and a PUCCH resource carrying a CSI (the second UCI) overlap and it is determined that the first UCI and the second UCI satisfy at least one of the above-mentioned several cases requiring dropping the second UCI (i.e., it is determined that the PUCCH format used for the multiplexing transmission of the first UCI and the second UCIs will be different from the PUCCH format used for transmission of the first UCI), it is determined that the terminal will drop the second UCI and transmit only the first UCI, then it is sufficient for the base station not to receive the second UCI but only the first UCI on the PUCCH corresponding to the first UCI.

When a PUCCH carrying a HARQ-ACK corresponding to a URLLC (the first UCI) and a PUCCH carrying a CSI (the second UCI) overlap and it is determined that the first UCI and the second UCI do not satisfy at least one of the above-mentioned several situations requiring dropping the second UCI (i.e., it is determined that the PUCCH format used for multiplexing transmission of the first UCI and the second UCI is same as the PUCCH format used for transmission of the first UCI), then the terminal side can multiplex the transmission of the overlapping UCIs according to the above-mentioned multiplexing transmission rules; and the base station side can likewise determine that the terminal has not dropped the UCIs and has performed the multiplexing transmission of the UCIs according to the multiplexing transmission rules and just receive the first UCI and the second UCI according to the corresponding transmission method.

It is noted that, in embodiment 1, if for the PUCCH carrying CSI (the second UCI) as described above, the CSI carried is replaced with CSI+SR, or HARQ-ACK corresponding to eMBB, or CSI+HARQ-ACK corresponding to eMBB, or CSI+SR+HARQ-ACK corresponding to eMBB, and if for the PUCCH carrying HARQ-ACK (the first UCI) as described above, the HARQ-ACK carried is replaced with the SR corresponding to the URLLC, or the HARQ-ACK corresponding to the URLLC+the SR corresponding to the URLLC, and the above process is performed for the terminal and the base station, that is, the terminal drops the second UCI, and the base station determines that the second UCI is dropped and receives the first UCI on the corresponding PUCCH corresponding to the first UCI.

It is further clarified that, in embodiment 1, if for the PUCCH carrying the CSI (the second UCI) described above, the CSI carried is replaced with the UCI corresponding to the second service or the second priority, and for the PUCCH carrying the HARQ-ACK corresponding to the URLLC, the HARQ-ACK carried is replaced with the UCI corresponding to the first service or the first priority. Regardless of whether the two UCIs are of the same type, the above process is performed equally for the terminal and the base station, that is, the terminal drops the second UCI, and the base station determines that the second UCI is dropped and receives the first UCI on the PUCCH corresponding to the first UCI. For example, the HARQ-ACK corresponding to the URLLC is replaced with the HARQ-ACK corresponding to the first priority, the CSI is replaced with any of the UCIs corresponding to the second priority (e.g., including at least one of CSI, SR, and HARQ-ACK) or a combination of multiple types of UCIs.

Embodiment 2

Setting a PUCCH carrying a HARQ-ACK corresponding to a URLLC (the first UCI) and a PUCCH carrying an SR corresponding to a URLLC (the second UCI) overlap, that is, both the first UCI and the second UCI are UCIs corresponding to the URLLC (i.e., corresponding to the same service type or priority), assuming that the HARQ-ACK is transmitted using PUCCH format 0, i.e., using the first PUCCH format, while the SR is transmitted using PUCCH format 0 or 1; then:

Terminal side: based on the first UCI and the second UCI of the above conditions, an analysis is performed to determine that the first UCI and the second UCI do not satisfy any one of the above conditions requiring the dropping of the second UCI, then it can be determined that the dropping of the second UCI is not required and that the first UCI and the second UCI can be transmitted (i.e., multiplexing transmission) simultaneously, specifically, the multiplexing transmission of the HARQ-ACK and the SR corresponding to the URLLC.

Optionally, the state of the SR can be implicitly expressed by transmitting the HARQ-ACK on the PUCCH resource of the HARQ-ACK using the cyclic shift set for transmitting the HARQ-ACK corresponding to different SR states through using the above enumerated multiplexing transmission rules, and if the SR is negative, then when using the negative SR, the cyclic shift set corresponding to the HARQ-ACK transmits HARQ-ACK through PUCCH format 0; if SR is positive, then when using positive SR, the cyclic shift set corresponding to the HARQ-ACK transmits HARQ-ACK through PUCCH format 0. Since the defined cyclic shift set for the HARQ-ACK transmission under positive SR and negative SR is different, the base station can implicitly obtain the state of SR according to which cyclic shift set is used to detect HARQ-ACK, so as to achieve the simultaneous transmission of HARQ-ACK and SR; as shown in FIG. 5; multiplexing transmission does not change the PUCCH format of the HARQ-ACK transmission, thus not affecting the transmission performance, and also does not change the PUCCH resources and thus does not affect the transmission delay.

Base station side: when it is determined that a PUCCH carrying a HARQ-ACK corresponding to a URLLC (the first UCI) and a PUCCH carrying an SR corresponding to a URLLC (the second UCI) overlap, and based on the analysis of several cases requiring the dropping of the second UCI as described above, it is determined that the first UCI and the second UCI do not satisfy any one of the above cases, then it is possible to further determine that the terminal performs multiplexing transmission of the first UCI and the second UCI, that the multiplexing transmission rules used are those mentioned above, and that the first UCI and the second UCI are received according to the transmission solution corresponding to the above mentioned multiplexing transmission rules, i.e., on the PUCCH format 0 resource of the HARQ-ACK, try to receive HARQ-ACK in turn using the cyclic shift in the cyclic shift set corresponding to the positive and negative SR respectively, and determine the corresponding HARQ-ACK information by at which cyclic shift the information is received, and determine whether the SR is positive or negative by the cyclic shift set to which the cyclic shift receiving the information is belongs, so as to achieve simultaneous reception of HARQ-ACK and SR.

It is noted that if the first UCI is a HARQ-ACK corresponding to a URLLC and is transmitted using one of PUCCH formats 2, 3 and 4; and if the second UCI is one or a combination of CSI, SR corresponding to an eMBB, HARQ-ACK corresponding to an eMBB, and also any of the above-mentioned cases requiring the dropping of the second UCI is not satisfied, then the first UCI and the second UCI can be multiplexed for transmission based on the above multiplexing transmission rules, i.e., a PUCCH resource set can be determined based on the total number of bits of the second UCI and the first UCI, and since the first UCI (corresponding to the HARQ-ACK of the URLLC) itself is transmitted using PUCCH format 2, 3 or 4, then its own number of bits is greater than 2 bits, then the PUCCH resource set determined according to the total number of bits of the second UCI and the first UCI must be the set carrying greater than 2 bits of UCI, and this set contains only the resources of PUCCH format 2, 3 or 4, so the determined resources for multiplexing the transmission of the first UCI and the second UCI is also one of the corresponding PUCCH format 2, 3 and 4, that is, it does not change the type of PUCCH format corresponding to the original first UCI, it does not affect the transmission performance (assuming that the PUCCH resources belonging to the type of PUCCH format 2, 3 and 4 all correspond to the same target code rate), and the base station can ensure that the time domain location of these resources does not differ significantly when configuring the resource set, so as to ensure that even if the re-determined multiplexing transmission resources for transmission of the first UCI and the second UCI are different from the original resources carrying the first UCI, the transmission delay difference is not significant; as shown in FIG. 6.

It is to be noted that, in the above determination of whether the PUCCH format used for the multiplexing transmission is the same as the PUCCH format corresponding to the original first UCI, the PUCCH format used for the multiplexing transmission is considered not to have changed, as long as it is determined that the PUCCH format used for the multiplexing transmission belongs to the set of PUCCH formats 2, 3 and 4, i.e. it is not necessary to require that the PUCCH format corresponding to the original first UCI is PUCCH format 2 and the format of the multiplexing transmission must be PUCCH format 2.

It is to be noted that, in the embodiments of the present disclosure, the relative positions of the PUCCH resource of the first UCI and the PUCCH resource of the second UCI are only examples, and the starting position of the PUCCH resource carrying the second UCI may be earlier or later than or aligned with the starting position of the PUCCH resource carrying the first UCI; the ending position of the PUCCH carrying the second UCI may be earlier or later than or aligned with the ending position of the PUCCH carrying the first UCI.

It is to be noted that, in embodiments of the present disclosure, when the first UCI is a HARQ-ACK, the PUCCH carrying the HARQ-ACK is transmitted in a sub-time slot in a time slot, and the PUCCH carrying the second UCI may be a time-slot-based or sub-time slot-based transmission, wherein the sub-time slot is an agreed or configured time unit of a fixed number of symbols in a time slot wherein the order of the sub-time slots in a time slot, the position of each sub-time slot, and the number of symbols contained in the sub-time slot are pre-agreed or configured. The number of symbols contained in different sub-time slots of a time slot is the same or different. That is, the number of symbols contained in each sub-time slot contained in the same time slot may all be the same, e.g., all 7 or 2 symbols, and of course the number of symbols contained in each sub-time slot may be different, e.g., the first sub-time slot includes 4 symbols, and the second sub-time slot includes 3 symbols, but the exact number of symbols can be determined by pre-agreement or configuration.

It is noted that in the present disclosure, HARQ-ACKs include SPS HARQ-ACKs and/or dynamic HARQ-ACKs (i.e., HARQ-ACKs with corresponding PDCCHs).

The transmission method of the uplink control information (UCI) described in the embodiments of the present disclosure implements the UCI transmission when the UCIs corresponding to different service types or different priorities overlap on the basis of ensuring that the transmission reliability and delay of the high priority UCIs are not affected.

As shown in FIG. 7, the transmission method of uplink control information (UCI) according to another embodiment of the present disclosure, applied to a base station, includes:

S710, when a physical uplink control channel (PUCCH) carrying the first UCI and a PUCCH carrying the second UCI overlap in the time domain, determining that the second UCI is dropped and receiving only the first UCI, if the PUCCH format used for simultaneous transmission of the first UCI and the second UCI is different from the PUCCH format used for the PUCCH carrying the first UCI.

Using the UCI transmission method of the an embodiment of the present disclosure, when a PUCCH carrying the first UCI and a PUCCH carrying the second UCI overlap in the time domain, if multiplexing transmission of the first UCI and the second UCI may cause the first UCI to change the PUCCH format used, for example, from PUCCH format 0 or 1 to PUCCH format 2, PUCCH format 3 or PUCCH format 4, then it is determined that the terminal does not multiplex the transmission of the first UCI and the second UCI, and the second UCI is dropped and receiving only the first UCI. This method can be applied to the UCI transmission of URLLC services to avoid the problem of transmission delay and reliability of UCIs corresponding to URLLC services when the UCI transmissions of different service types overlap.

Specifically, the UCI transmission method, wherein the priority of the service type to which the first UCI belongs is higher than the priority of the service type to which the second UCI belongs; or, the first UCI belongs to an Ultra Reliable Low Latency Communication (URLLC) service, and the second UCI belongs to an Enhanced Mobile Broadband (eMBB) service; or, the priority of the first UCI is higher than the priority of the second UCI.

Optionally, the UCI transmission method, wherein determining that the second UCI is dropped if the PUCCH format used for simultaneous transmission of the first UCI and the second UCI is different from the PUCCH format used for the PUCCH carrying the first UCI specifically includes at least one of:

determining that the second UCI is dropped if the PUCCH format used for transmission of the first UCI is the first PUCCH format, and the number of bits of the second UCI is greater than the preset value;

determining that the second UCI is dropped if the number of bits of the first UCI is less than or equal to the preset value, and the number of bits of the second UCI is greater than the preset value;

determining that the second UCI is dropped if the PUCCH format used for transmission of the first UCI is the first PUCCH format and the PUCCH format used for transmission of the second UCI is the second PUCCH format;

determining that the second UCI is dropped if the number of bits of the first UCI is less than or equal to the preset value, and the PUCCH format used for transmission of the second UCI is the second PUCCH format;

determining that the second UCI is dropped if the PUCCH format used for transmission of the first UCI is the first PUCCH format, and the second UCI is channel state information (CSI);

determining that the second UCI is dropped if the number of bits of the first UCI is less than or equal to the preset value, and the second UCI is channel state information (CSI);

determining that the second UCI is dropped if the first UCI is a hybrid automatic repeat request acknowledgement (HARQ-ACK) and/or a scheduling request (SR) corresponding to a preset service type, and the PUCCH format used for transmission of the first UCI is the first PUCCH format, and the second UCI is CSI;

determining that the second UCI is dropped if the first UCI is a hybrid automatic repeat request acknowledgement HARQ-ACK and/or scheduling request SR corresponding to a preset service type, and the number of bits of the first UCI is less than or equal to the preset value, the first UCI is CSI;

determining that the second UCI is dropped if the PUCCH format used for transmission of the first UCI is the first PUCCH format, and the total number of bits of the first UCI and the second UCI is greater than the preset value;

determining that the second UCI is dropped if the number of bits of the first UCI is less than or equal to the preset value, and the total number of bits of the first UCI and the second UCI is greater than the preset value;

wherein, the first PUCCH format includes at least one of PUCCH format 0 and PUCCH format 1;

the second PUCCH format includes at least one of PUCCH format 2, PUCCH format 3 and PUCCH format 4;

the preset service type is URLLC or a high-priority service type.

The specific implementation process when using the transmission method of uplink control information (UCI) as described in the present disclosure can be referred to the example descriptions of embodiment 1 and embodiment 2 above and will not be described in detail herein. One of the embodiments of the present disclosure also provides a terminal, as shown in FIG. 8, the terminal includes: a processor 801; and a memory 803 connected to the processor 801 via a bus interface 802, the memory 803 being used to store programs and data used for the processor 801 in performing operations, and a transceiver 804 connected to the bus interface 802 for receiving and sending data under the control of processor 801.

Wherein, when the processor 801 calls and executes the programs and data stored in the memory 803, the following process is executed:

when a physical uplink control channel (PUCCH) carrying the first UCI and a PUCCH carrying the second UCI overlap in the time domain, dropping the second UCI and transmitting the first UCI, if the PUCCH format used for simultaneous transmission of the first UCI and the second UCI is different from the PUCCH format used for the PUCCH carrying the first UCI.

Optionally, the terminal, therein the priority of the service type to which the first UCI belongs is higher than the priority of the service type to which the second UCI belongs; or, the first UCI belongs to an Ultra Reliable Low Latency Communication (URLLC) service, and the second UCI belongs to an Enhanced Mobile Broadband (eMBB) service; or, the priority of the first UCI is higher than the priority of the second UCI.

Optionally, the terminal, therein the dropping the second UCI if the PUCCH format used for simultaneous transmission of the first UCI and the second UCI is different from the PUCCH format used for the PUCCH carrying the first UCI specifically includes at least one of:
  dropping the second UCI if the PUCCH format used for transmission of the first UCI is the first PUCCH format, and the number of bits of the second UCI is greater than a preset value;
  dropping the second UCI if the number of bits of the first UCI is less than or equal to a preset value, and the number of bits of the second UCI is greater than a preset value;
  dropping the second UCI if the PUCCH format used for transmission of the first UCI is the first PUCCH format and the PUCCH format used for transmission of the second UCI is the second PUCCH format;
  dropping the second UCI if the number of bits of the first UCI is less than or equal to a preset value, and the PUCCH format used for transmission of the second UCI is the second PUCCH format;
  dropping the second UCI if the PUCCH format used for transmission of the first UCI is the first PUCCH format, and the second UCI is channel state information (CSI);
  dropping the second UCI if the number of bits of the first UCI is less than or equal to a preset value, and the second UCI is channel state information (CSI);
  dropping the second UCI if the first UCI is a hybrid automatic repeat request acknowledgement (HARQ-ACK) and/or a scheduling request (SR) corresponding to a preset service type, and the PUCCH format used for transmission of the first UCI is the first PUCCH format, and the second UCI is CSI;
  dropping the second UCI if the first UCI is a hybrid automatic repeat request acknowledgement HARQ-ACK and/or scheduling request SR corresponding to a preset service type, and the number of bits of the first UCI is less than or equal to the preset value, the first UCI is CSI;
  dropping the second UCI if the PUCCH format used for transmission of the first UCI is the first PUCCH format, and the total number of bits of the first UCI and the second UCI is greater than a preset value;
  dropping the second UCI if the number of bits of the first UCI is less than or equal to a preset value, and the total number of bits of the first UCI and the second UCI is greater than a preset value;
  wherein, the first PUCCH format includes at least one of PUCCH format 0 and PUCCH format 1;
  the second PUCCH format includes at least one of PUCCH format 2, PUCCH format 3 and PUCCH format 4;
  the preset service type is URLLC or a high-priority service type.

Optionally, the terminal, wherein the preset value is 2.

It should be noted that, in FIG. 8, the bus architecture may include any number of interconnected buses and bridges, specifically, various circuits of one or more processors represented by the processor 801 and the memory represented by the memory 803 are connected together. The bus architecture can also connect various other circuits such as peripheral devices, voltage regulators, power management circuits, etc., which are all known in the field, and therefore, no further descriptions are provided herein. The bus interface provides the interface. The transceiver 804 may be a plurality of elements, including a transmitter and a transceiver, and provides a unit for communicating with various other devices on the transmission medium. For different terminals, the user interface 805 may also be an interface capable of connecting externally and internally with required equipment. The connected equipment includes but is not limited to a keypad, a display, a speaker, a microphone, a joystick, etc. The processor 801 is responsible for managing the bus architecture and general processing, and the memory 803 can store data used for the processor 801 when performing operations.

A person skilled in the art can understand that all or part of the steps of the above-mentioned embodiments can be implemented by hardware, or can also be implemented by instructing the relevant hardware through a computer program. The computer program includes instructions for performing part or all of the steps of the above-mentioned method; and the computer program can be stored in a readable storage medium, and the storage medium can be any form of storage medium.

Figure 9:
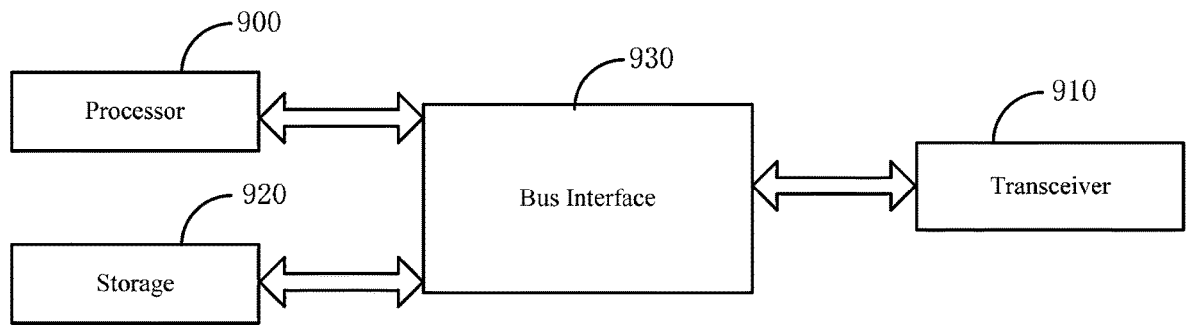
FIG. 9 is a schematic structural diagram of the base station according to an embodiment of the disclosure.

Embodiments of the present disclosure also provide a base station, as shown in FIG. 9, the base station includes: a processor 900; a memory 920 connected to the processor 900 via a bus interface 930, and a transceiver 910 connected to the processor 900 via the bus interface; the memory 920 is used to store programs and data used for the processor 900 in executing operations; sending data information or guide frequencies through the transceiver 910 and also receiving uplink control channel through the transceiver 910; when the processor 900 calls and executes the program and data stored in the memory 920, the following functional modules are implemented: the processor 900 is used to read the programs in the memory 920 and perform the following processes:
  when a physical uplink control channel (PUCCH) carrying a first UCI and a PUCCH carrying a second UCI overlap in a time domain, determining that the second UCI is dropped and receiving only the first UCI, if a PUCCH format used for simultaneous transmission of the first UCI and the second UCI is different from a PUCCH format used for a PUCCH carrying the first UCI.

Optionally, the base station, wherein a priority of a service type to which the first UCI belongs is higher than a priority of a service type to which the second UCI belongs; or,
  the first UCI belongs to an Ultra Reliable Low Latency Communication (URLLC) service, and the second UCI belongs to an Enhanced Mobile Broadband (eMBB) service; or,
  a priority of the first UCI is higher than a priority of the second UCI.

Optionally, the base station, wherein, the determining that the second UCI is dropped if the PUCCH format used for simultaneous transmission of the first UCI and the second UCI is different from the PUCCH format used for the PUCCH carrying the first UCI comprises at least one of:
  determining that the second UCI is dropped if a PUCCH format used for transmission of the first UCI is a first PUCCH format, and a number of bits of the second UCI is greater than a preset value;
  determining that the second UCI is dropped if a number of bits of the first UCI is less than or equal to a preset value, and the number of bits of the second UCI is greater than a preset value;
  determining that the second UCI is dropped if a PUCCH format used for transmission of the first UCI is a first PUCCH format and the PUCCH format used for transmission of the second UCI is a second PUCCH format;

determining that the second UCI is dropped if a number of bits of the first UCI is less than or equal to a preset value, and the PUCCH format used for transmission of the second UCI is a second PUCCH format;

determining that the second UCI is dropped if the PUCCH format used for transmission of the first UCI is a first PUCCH format, and the second UCI is channel state information (CSI);

determining that the second UCI is dropped if a number of bits of the first UCI is less than or equal to a preset value, and the second UCI is channel state information (CSI);

determining that the second UCI is dropped if the first UCI is a hybrid automatic repeat request acknowledgement (HARQ-ACK) and/or a scheduling request (SR) corresponding to a preset service type, and the PUCCH format used for transmission of the first UCI is a first PUCCH format, and the second UCI is CSI;

determining that the second UCI is dropped if the first UCI is a hybrid automatic repeat request acknowledgement HARQ-ACK and/or scheduling request SR corresponding to a preset service type, and the number of bits of the first UCI is less than or equal to the preset value, the first UCI is CSI;

determining that the second UCI is dropped if the PUCCH format used for transmission of the first UCI is a first PUCCH format, and a total number of bits of the first UCI and the second UCI is greater than a preset value;

determining that the second UCI is dropped if a number of bits of the first UCI is less than or equal to a preset value, and a total number of bits of the first UCI and the second UCI is greater than a preset value;

wherein, the first PUCCH format includes at least one of PUCCH format 0 and PUCCH format 1;

the second PUCCH format includes at least one of PUCCH format 2, PUCCH format 3 and PUCCH format 4;

the preset service type is URLLC or a high-priority service type.

Optionally, the transmission method, wherein the preset value is 2.

In addition, in FIG. 3, the bus architecture may include any number of interconnected buses and bridges, specifically various circuits such as one or more processors represented by the processor 900 and the memory represented by the memory 920 are connected together. The bus architecture can also connect various other circuits such as peripheral devices, voltage regulators, power management circuits, etc., which are all known in the field, and therefore, will not be further described herein. The bus interface provides the interface. The transceiver 910 may be a plurality of elements, that is, including a transmitter and a receiver, and provide a unit for communicating with various other devices on the transmission medium. The processor 300 is responsible for managing the bus architecture and general processing, and the memory 920 can store data used for the processor 900 when performing operations.

Figure 10:
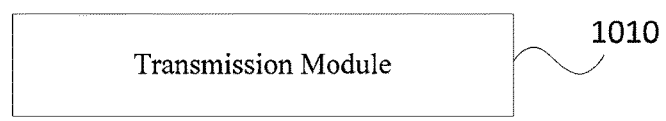
FIG. 10 is a schematic structural diagram of a transmission device according to an embodiment of the present disclosure.

The embodiment of the present disclosure also provides a transmission device of uplink control information (UCI), which is applied to a terminal. As shown in FIG. 10, the device includes:

a transmission module 1010, configured to, when a physical uplink control channel (PUCCH) carrying a first UCI and a PUCCH carrying a second UCI overlap in a time domain, drop the second UCI and transmitting the first UCI, if a PUCCH format used for simultaneous transmission of the first UCI and the second UCI is different from a PUCCH format used for a PUCCH carrying the first UCI.

Optionally, the transmission device, therein the priority of the service type to which the first UCI belongs is higher than the priority of the service type to which the second UCI belongs; or, the first UCI belongs to an Ultra Reliable Low Latency Communication (URLLC) service, and the second UCI belongs to an Enhanced Mobile Broadband (eMBB) service; or, the priority of the first UCI is higher than the priority of the second UCI.

Optionally, the transmission device, therein the dropping the second UCI if the PUCCH format used for simultaneous transmission of the first UCI and the second UCI is different from the PUCCH format used for the PUCCH carrying the first UCI specifically includes at least one of:

dropping the second UCI if the PUCCH format used for transmission of the first UCI is the first PUCCH format, and the number of bits of the second UCI is greater than a preset value;

dropping the second UCI if the number of bits of the first UCI is less than or equal to a preset value, and the number of bits of the second UCI is greater than a preset value;

dropping the second UCI if the PUCCH format used for transmission of the first UCI is the first PUCCH format and the PUCCH format used for transmission of the second UCI is the second PUCCH format;

dropping the second UCI if the number of bits of the first UCI is less than or equal to a preset value, and the PUCCH format used for transmission of the second UCI is the second PUCCH format;

dropping the second UCI if the PUCCH format used for transmission of the first UCI is the first PUCCH format, and the second UCI is channel state information (CSI);

dropping the second UCI if the number of bits of the first UCI is less than or equal to a preset value, and the second UCI is channel state information (CSI);

dropping the second UCI if the first UCI is a hybrid automatic repeat request acknowledgement (HARQ-ACK) and/or a scheduling request (SR) corresponding to a preset service type, and the PUCCH format used for transmission of the first UCI is the first PUCCH format, and the second UCI is CSI;

dropping the second UCI if the first UCI is a hybrid automatic repeat request acknowledgement HARQ-ACK and/or scheduling request SR corresponding to a preset service type, and the number of bits of the first UCI is less than or equal to the preset value, the first UCI is CSI;

dropping the second UCI if the PUCCH format used for transmission of the first UCI is the first PUCCH format, and the total number of bits of the first UCI and the second UCI is greater than a preset value;

dropping the second UCI if the number of bits of the first UCI is less than or equal to a preset value, and the total number of bits of the first UCI and the second UCI is greater than a preset value;

wherein, the first PUCCH format includes at least one of PUCCH format 0 and PUCCH format 1;

the second PUCCH format includes at least one of PUCCH format 2, PUCCH format 3 and PUCCH format 4;

the preset service type is URLLC or a high-priority service type.

Optionally, the transmission device, wherein the preset value is 2.

Figure 11:
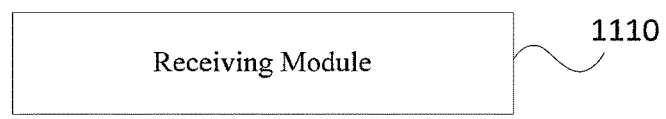
FIG. 11 is a schematic structural diagram of a transmission device according to another embodiment of the disclosure.

The embodiment of the present disclosure also provides a transmission device of uplink control information (UCI), which is applied to a base station. As shown in FIG. 11, the device includes:

a receiving module 110, configured to, when a physical uplink control channel (PUCCH) carrying a first UCI and a PUCCH carrying a second UCI overlap in a time domain, determine that the second UCI is dropped and receiving only the first UCI, if a PUCCH format used for simultaneous transmission of the first UCI and the second UCI is different from a PUCCH format used for a PUCCH carrying the first UCI.

Optionally, the transmission device, wherein a priority of a service type to which the first UCI belongs is higher than a priority of a service type to which the second UCI belongs; or, the first UCI belongs to an Ultra Reliable Low Latency Communication (URLLC) service, and the second UCI belongs to an Enhanced Mobile Broadband (eMBB) service; or, a priority of the first UCI is higher than a priority of the second UCI.

Optionally, the transmission device, wherein, the determining that the second UCI is dropped if the PUCCH format used for simultaneous transmission of the first UCI and the second UCI is different from the PUCCH format used for the PUCCH carrying the first UCI comprises at least one of:

determining that the second UCI is dropped if a PUCCH format used for transmission of the first UCI is a first PUCCH format, and a number of bits of the second UCI is greater than a preset value;

determining that the second UCI is dropped if a number of bits of the first UCI is less than or equal to a preset value, and the number of bits of the second UCI is greater than a preset value;

determining that the second UCI is dropped if a PUCCH format used for transmission of the first UCI is a first PUCCH format and the PUCCH format used for transmission of the second UCI is a second PUCCH format;

determining that the second UCI is dropped if a number of bits of the first UCI is less than or equal to a preset value, and the PUCCH format used for transmission of the second UCI is a second PUCCH format;

determining that the second UCI is dropped if the PUCCH format used for transmission of the first UCI is a first PUCCH format, and the second UCI is channel state information (CSI);

determining that the second UCI is dropped if a number of bits of the first UCI is less than or equal to a preset value, and the second UCI is channel state information (CSI);

determining that the second UCI is dropped if the first UCI is a hybrid automatic repeat request acknowledgement (HARQ-ACK) and/or a scheduling request (SR) corresponding to a preset service type, and the PUCCH format used for transmission of the first UCI is a first PUCCH format, and the second UCI is CSI;

determining that the second UCI is dropped if the first UCI is a hybrid automatic repeat request acknowledgement HARQ-ACK and/or scheduling request SR corresponding to a preset service type, and the number of bits of the first UCI is less than or equal to the preset value, the first UCI is CSI;

determining that the second UCI is dropped if the PUCCH format used for transmission of the first UCI is a first PUCCH format, and a total number of bits of the first UCI and the second UCI is greater than a preset value;

determining that the second UCI is dropped if a number of bits of the first UCI is less than or equal to a preset value, and a total number of bits of the first UCI and the second UCI is greater than a preset value;

wherein, the first PUCCH format includes at least one of PUCCH format 0 and PUCCH format 1;

the second PUCCH format includes at least one of PUCCH format 2, PUCCH format 3 and PUCCH format 4;

the preset service type is URLLC or a high-priority service type.

Optionally, transmission device, wherein the preset value is 2.

In another aspect, specific embodiments of the present disclosure also provide a computer readable storage medium with a computer program stored thereon, when executed by a processor, the program implements the steps in the transmission method of uplink control information (UCI) as described in any one of the above.

Based on the above description, those skilled in the art should be able to understand the specific structure of the computer readable storage medium that executes the transmission method of the present disclosure, which will not be described in detail here.

In addition, it should be pointed out that in the device and method of the present disclosure, obviously, each component or each step can be decomposed and/or recombined. This decomposition and/or recombination should be regarded as equivalent solutions of the present disclosure. In addition, the steps of performing the above series of processing can naturally be performed in a chronological order in description, but do not necessarily need to be performed in the chronological order, and some steps can be performed in parallel or independently of each other. The person skilled in the art can understand that all or any of the steps or components of the method and device of the present disclosure can be used in any computing device (including a processor, storage medium, etc.) or a network of computing devices, and implemented by hardware, firmware, software, or any combination thereof. This can be achieved by the person skilled in the art using their basic programming skills after reading the description of the present disclosure.

Therefore, the purpose of the present disclosure can also be realized by running a program or a group of programs on any computing device. The computing device may be a well-known general-purpose device. Therefore, the purpose of the present disclosure can also be achieved only by providing a program product containing program code for implementing the method or device of the present disclosure. That is, such a program product also constitutes the present disclosure, and a storage medium storing such a program product also constitutes the present disclosure. Obviously, the storage medium may be any well-known storage medium, or any storage medium developed in the future. It should also be pointed out that in the device and method of the present disclosure, obviously, each component or each step can be decomposed and/or recombined. This decomposition and/or recombination should be regarded as equivalent solutions of the present disclosure. In addition, the steps of executing the above-mentioned series of processing can naturally be executed.

The above are optional implementations of the present disclosure. It should be pointed out that for a person skilled in the art, several improvements and modifications can be made without departing from the principles of the present disclosure. These improvements and modifications should also fall within the protection scope of the present disclosure.

What is claimed is:

1. A transmission method of uplink control information (UCI), applied to a terminal, comprising: when a physical uplink control channel (PUCCH) carrying a first UCI and a PUCCH carrying a second UCI overlap in a time domain, dropping the second UCI and transmitting the first UCI if a PUCCH format used for simultaneous transmission of the first UCI and the second UCI is different from a PUCCH format used for the PUCCH carrying the first UCI; wherein, the dropping the second UCI if the PUCCH format used for simultaneous transmission of the first UCI and the second UCI is different from the PUCCH format used for the PUCCH carrying the first UCI comprises at least one of: dropping the second UCI if the PUCCH format used for transmission of the first UCI is a first PUCCH format and a number of bits of the second UCI is greater than a preset value; dropping the second UCI if a number of bits of the first UCI is less than or equal to a preset value and a number of bits of the second UCI is greater than a preset value; dropping the second UCI if the PUCCH format used for transmission of the first UCI is a first PUCCH format and a PUCCH format used for transmission of the second UCI is a second PUCCH format; dropping the second UCI if a number of bits of the first UCI is less than or equal to a preset value, and a PUCCH format used for transmission of the second UCI is a second PUCCH format; dropping the second UCI if the PUCCH format used for transmission of the first UCI is a first PUCCH format, and the second UCI is channel state information (CSI); dropping the second UCI if a number of bits of the first UCI is less than or equal to a preset value, and the second UCI is channel state information (CSI); dropping the second UCI if the first UCI is a hybrid automatic repeat request acknowledgement (HARQ-ACK) corresponding to a preset service type and/or a scheduling request (SR) corresponding to a preset service type, and the PUCCH format used for transmission of the first UCI is a first PUCCH format, and the second UCI is CSI; dropping the second UCI if the first UCI is a hybrid automatic repeat request acknowledgement HARQ-ACK corresponding to a preset service type and/or scheduling request SR corresponding to a preset service type, and the number of bits of the first UCI is less than or equal to the preset value, the first UCI is CSI; dropping the second UCI if the PUCCH format used for transmission of the first UCI is a first PUCCH format, and a total number of bits of the first UCI and the second UCI is greater than a preset value; dropping the second UCI if a number of bits of the first UCI is less than or equal to a preset value, and a total number of bits of the first UCI and the second UCI is greater than a preset value; wherein, the first PUCCH format comprises at least one of PUCCH format 0 and PUCCH format 1; the second PUCCH format comprises at least one of PUCCH format 2, PUCCH format 3 and PUCCH format 4; the preset service type is URLLC or a high-priority service type.

2. The transmission method according to claim 1, wherein a priority of a service type to which the first UCI belongs is higher than a priority of a service type to which the second UCI belongs; or,
the first UCI belongs to an Ultra Reliable Low Latency Communication (URLLC) service, and the second UCI belongs to an Enhanced Mobile Broadband (eMBB) service; or,
a priority of the first UCI is higher than a priority of the second UCI.

3. The transmission method according to claim 1, wherein the preset value is 2.

4. A transmission method of uplink control information (UCI), applied to a base station, comprising: when a physical uplink control channel (PUCCH) carrying a first UCI and a PUCCH carrying a second UCI overlap in a time domain, determining that the second UCI is dropped and receiving only the first UCI, if a PUCCH format used for simultaneous transmission of the first UCI and the second UCI is different from a PUCCH format used for the PUCCH carrying the first UCI;
wherein, the determining that the second UCI is dropped if the PUCCH format used for simultaneous transmission of the first UCI and the second UCI is different from the PUCCH format used for the PUCCH carrying the first UCI comprises at least one of: determining that the second UCI is dropped if a PUCCH format used for transmission of the first UCI is a first PUCCH format, and a number of bits of the second UCI is greater than a preset value; determining that the second UCI is dropped if a number of bits of the first UCI is less than or equal to the preset value, and the number of bits of the second UCI is greater than the preset value; determining that the second UCI is dropped if the PUCCH format used for transmission of the first UCI is a first PUCCH format and a PUCCH format used for transmission of the second UCI is a second PUCCH format; determining that the second UCI is dropped if a number of bits of the first UCI is less than or equal to the preset value, and a PUCCH format used for transmission of the second UCI is a second PUCCH format; determining that the second UCI is dropped if the PUCCH format used for transmission of the first UCI is a first PUCCH format, and the second UCI is channel state information (CSI); determining that the second UCI is dropped if a number of bits of the first UCI is less than or equal to the preset value, and the second UCI is channel state information (CSI); determining that the second UCI is dropped if the first UCI is a hybrid automatic repeat request acknowledgement (HARQ-ACK) corresponding to a preset service type and/or a scheduling request (SR) corresponding to a preset service type, and the PUCCH format used for transmission of the first UCI is a first PUCCH format, and the second UCI is CSI; determining that the second UCI is dropped if the first UCI is a hybrid automatic repeat request acknowledgement HARQ-ACK corresponding to a preset service type and/or scheduling request SR corresponding to a preset service type, and the number of bits of the first UCI is less than or equal to the preset value, the first UCI is CSI; determining that the second UCI is dropped if the PUCCH format used for transmission of the first UCI is a first PUCCH format, and a total number of bits of the first UCI and the second UCI is greater than a preset value; determining that the second UCI is dropped if a number of bits of the first UCI is less than or equal to the preset value, and a total number of bits of the first UCI and the second UCI is greater than the preset value; wherein, the first PUCCH format comprises at least one of PUCCH format 0 and PUCCH format 1; the second PUCCH format comprises at least one of PUCCH format 2, PUCCH format 3 and PUCCH format 4; the preset service type is URLLC or a high-priority service type.

5. The transmission method according to claim 4, wherein a priority of a service type to which the first UCI belongs is higher than a priority of a service type to which the second UCI belongs; or, the first UCI belongs to an Ultra Reliable Low Latency Communication (URLLC) service, and the second UCI belongs to an Enhanced Mobile Broadband (eMBB) service; or, a priority of the first UCI is higher than a priority of the second UCI.

6. The transmission method according to claim 4, wherein the preset value is 2.

7. A terminal, comprising: a transceiver, a memory, a processor and a program stored in the memory and running on the processor; wherein the processor is configured for: when a physical uplink control channel (PUCCH) carrying a first UCI and a PUCCH carrying a second UCI overlap in a time domain, dropping the second UCI and transmitting the first UCI, if a PUCCH format used for simultaneous transmission of the first UCI and the second UCI is different from a PUCCH format used for the PUCCH carrying the first UCI; wherein, the dropping the second UCI if the PUCCH format used for simultaneous transmission of the first UCI and the second UCI is different from the PUCCH format used for the PUCCH carrying the first UCI comprises at least one of: dropping the second UCI if a PUCCH format used for transmission of the first UCI is a first PUCCH format, and a number of bits of the second UCI is greater than a preset value; dropping the second UCI if a number of bits of the first UCI is less than or equal to a preset value, and the number of bits of the second UCI is greater than the preset value; dropping the second UCI if the PUCCH format used for transmission of the first UCI is a first PUCCH format and a PUCCH format used for transmission of the second UCI is a second PUCCH format; dropping the second UCI if a number of bits of the first UCI is less than or equal to the preset value, and a PUCCH format used for transmission of the second UCI is a second PUCCH format; dropping the second UCI if the PUCCH format used for transmission of the first UCI is a first PUCCH format, and the second UCI is channel state information (CSI); dropping the second UCI if a number of bits of the first UCI is less than or equal to the preset value, and the second UCI is channel state information (CSI); dropping the second UCI if the first UCI is a hybrid automatic repeat request acknowledgement (HARQ-ACK) corresponding to a preset service type and/or a scheduling request (SR) corresponding to a preset service type, and the PUCCH format used for transmission of the first UCI is a first PUCCH format, and the second UCI is CSI; dropping the second UCI if the first UCI is a hybrid automatic repeat request acknowledgement HARQ-ACK corresponding to a preset service type and/or scheduling request SR corresponding to a preset service type, and the number of bits of the first UCI is less than or equal to the preset value, the first UCI is CSI; dropping the second UCI if the PUCCH format used for transmission of the first UCI is a first PUCCH format, and a total number of bits of the first UCI and the second UCI is greater than the preset value; dropping the second UCI if a number of bits of the first UCI is less than or equal to the preset value, and a total number of bits of the first UCI and the second UCI is greater than the preset value; wherein, the first PUCCH format comprises at least one of PUCCH format 0 and PUCCH format 1; the second PUCCH format comprises at least one of PUCCH format 2, PUCCH format 3 and PUCCH format 4; the preset service type is URLLC or a high-priority service type.

8. The terminal according to claim 7, wherein a priority of a service type to which the first UCI belongs is higher than a priority of a service type to which the second UCI belongs; or, the first UCI belongs to an Ultra Reliable Low Latency Communication (URLLC) service, and the second UCI belongs to an Enhanced Mobile Broadband (eMBB) service; or, a priority of the first UCI is higher than a priority of the second UCI.

9. The transmission method according to claim 7, wherein the preset value is 2.

10. A base station, comprising: a transceiver, a memory, a processor, and a program stored in the memory and running on the processor; wherein the processor is configured to implement, when the program is executed by the processor, the steps in the transmission method of uplink control information (UCI) according to claim 1.

11. The base station according to claim 10, wherein a priority of a service type to which the first UCI belongs is higher than a priority of a service type to which the second UCI belongs; or, the first UCI belongs to an Ultra Reliable Low Latency Communication (URLLC) service, and the second UCI belongs to an Enhanced Mobile Broadband (eMBB) service; or, a priority of the first UCI is higher than a priority of the second UCI.

12. The transmission method according to claim 10, wherein the preset value is 2.

13. A non-transitory computer readable storage medium with a computer program stored thereon, when executed by a processor, the program implements the steps in the transmission method of uplink control information (UCI) according to claim 1.

14. A non-transitory computer readable storage medium with a computer program stored thereon, when executed by a processor, the program implements the steps in the transmission method of uplink control information (UCI) according to claim 5.

* * * * *